UNITED STATES PATENT OFFICE 2,657,205

DYES CONTAINING A VINYL SULFONE

Johannes Heyna, Frankfurt am Main Unterliederbach, and Wilhelm Schumacher, Frankfurt am Main, Germany, assignors to Farbwerke Hoechst Aktiengesellschaft vormals Meister Lucius und Bruning, Frankfurt am Main Hochst, Germany, a German company No Drawing. Application December 20, 1950, Serial No. 201,859. In Germany January 9, 1950

8 Claims. (Cl. 260—185)

The present invention relates to a process for producing fast dyeings and to the manufacture of dyestuffs for use therein. It is based on the observation that dyeings or prints of very good fastness properties can be produced on fibrous materials, and especially on nitrogenous fibrous materials, by applying to the material an acid dyestuff containing one or more groupings of the formula

—SO$_2$—CR=CH$_2$ in which R represents hydrogen, a hydrocarbon radical of low molecular weight or halogen.

Acid dyestuffs, which contain one or more of the groupings —SO$_2$—CR=CH$_2$, may belong to various classes of dyestuffs. They may, for instance, be derived from the series of azo-dyestuffs, nitrodyestuffs, anthraquinone-dyestuffs, triphenylmethane-dyestuffs or the like.

The invention also relates to a process for the manufacture of dyestuffs which comprises introducing into the molecule of an acid dyestuff or a primary product thereof according to a known method one or more groupings of the formula

—SO$_2$—CR=CH$_2$ in which R represents hydrogen, a hydrocarbon radical of low molecular weight or halogen.

The products may be prepared by various methods, for instance, by converting an acid dyestuff or a primary product into the sulfinic acid or the sodium salt of such acid, and then reacting the product with beta-chlorethyl alcohol or ethylene oxide or a homologue thereof. From the beta-hydroxy-ethyl-sulfones obtained by such a reaction, the compounds containing the group

—SO$_2$—CR=CH$_2$ may be obtained in the usual manner, and these compounds, if primary products are concerned, may be condensed with reactive components which, if required, may contain an acid group. Compounds of the present kind may also be prepared by subjecting to oxidation a compound containing the grouping —S—CR=CH$_2$ or the grouping —SO—CR=CH$_2$. Finally neutral dyestuffs containing a vinylsulfone group may be sulfonated.

In the case of azo-dyestuffs the grouping —SO$_2$—CR=CH$_2$ may be present once or several times in the diazo-component or in the coupling component, or in both components. In the series of the azo-dyestuffs the following examples may be mentioned as showing the types coming into consideration for the present process. The azo-dyestuffs from diazotized:

(1) 1-aminophenyl-3-vinylsulfone and 1-(2'-chloro-5'-sulfophenyl) 3 - methyl-5-pyrazolone,
(2) 1-amino-2-methoxyphenyl - 5 - vinylsulfone and 1-hydroxynaphthalene-5-sulfonic acid,
(3) 1 - aminophenyl-3-(alpha-bromovinyl)-sulfone and 1-hydroxynaphthalene - 5 - sulfonic acid,
(4) 1-amino-2-methylphenyl-5-vinylsulfone and 1-hydroxynaphthalene-4-sulfonic acid,
(5) 1-amino-2-methylphenyl-5-vinylsulfone and 2 - phenylamino-8-hydroxynaphthalene-6-sulfonic acid,
(6) 1 - aminonaphthyl - 5 - vinylsulfone and N-ethyl-N-(3'-sulfobenzyl)-aniline,
(7) 1 - aminonaphthyl - 5 - vinylsulfone and N-ethyl-N-(3'-sulfobenzyl)-3-methyl-aniline,
(8) 1-aminophenyl-4-vinylsulfone and 1-amino-8-hydroxynaphthalene-3:6-disulfonic acid,
(9) 1-amino-2-methoxyphenyl - 5 - vinylsulfone and 2-amino-8-hydroxy - naphthalene-6-sulfonic acid,
(10) 1 - aminophenyl-3-sulfonic acid and 1-hydroxynaphthyl-4-vinylsulfone,
(11) 1-aminobenzene-4-sulfonic acid and 1-hydroxy-naphthyl-5-vinylsulfone,
(12) 1 - amino-2-methoxyphenyl-5-vinylsulfone and 1-(6'-chloro-2'-methyl-4'-sulfophenyl)-3-methyl-5-pyrazolone,
(13) 1 - aminophenyl-3-(alpha-bromovinyl-sulfone) and 1-hydroxynaphthalene - 4 - sulfonic acid,
(14) 1-amino-2-hydroxyphenyl - 5 - vinylsulfone and 2-aminonaphthalene-5-sulfonic acid with subsequent chroming,
(15) 1-aminobenzene-3-sulfonic acid and 1-(3'-vinylsulfonylphenyl)-3-methyl-3-pyrazolone,
(16) 4-amino-2-methyl-4'-vinylsulfone-1:1'-azobenzene and 2-aminonaphthalene - 6 - sulfonic acid,
(17) 4-amino-2-sulfodiphenylamine and 1-aminonaphthyl-6-vinylsulfone, further diazotized and coupled with 2-hydroxy-naphthalene-6-sulfonic acid.

As further examples of dyestuffs from other classes coming into consideration for the present process, the following dyestuffs may be named:

(1) 2:4 - dinitro - 3'-sulfo-4'-(2''-methoxy-5''-vinylsulfonyl)-phenylamino-diphenylamine of the formula

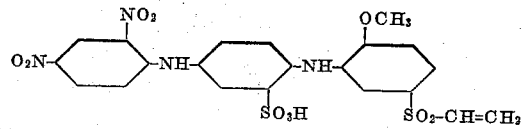

(from 2:4-dinitro-1-chlorobenzene and 4-amino-2 - sulfo - 2'-methoxydiphenylamino-5'-vinyl-sulfone).

(2) 1-amino-2-sulfo-4-(2'-methoxy-5'-vinylsulfonyl)-phenylamino-anthraquinone of the formula

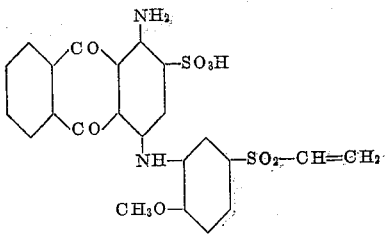

(from 1-amino-4-bromo-anthraquinone - 2 - sulfonic acid and 1-amino-2-methoxyphenyl-5-vinylsulfone).

(3) copper-phthalocyan - divinylsulfone - disulfonic acid from phthalic anhydride and phthalic anhydride vinyl sulfone with a subsequent sulfonation, (4) 1-amino - 2 - sulfo - 4 - (3' - vinylsulfonyl) - phenylaminoanthraquinone, (5) the tertiary condensation product of cyanuric chloride with 1 mol of the monoazo-dyestuff obtained from diazotized 1-aminophenyl-4-vinylsulfone and 1 - amino - 2 - methoxy - 5-methylbenzene, 1 mol of the reduced monoazo dyestuff obtained from diazotized para-nitraniline and salicylic acid and 1 mole of 1-aminobenzene-3-sulfonic acid.

(6) disulfonic acid of the 1:4-di-(3'-vinylsulfonyl)-phenyl-amino-anthraquinone from 1:4-dibromoanthraquinone and 1-aminobenzene-3-vinylsulfone with subsequent sulfonation, (7) 2:4-dinitro-6-sulfo - 9 - (3' - vinylsulfonyl)-phenyl-di-hydro phenazine of the formula

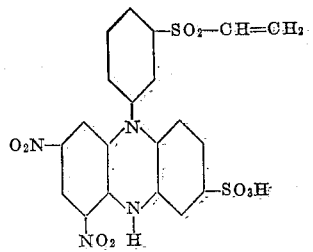

(from 1-chloro-2:4:6-trinitrobenzene and 2-amino-4 - sulfo - 3' - vinylsulfonyl - diphenylamine), (8) reaction product from aminonaphthalsulfonic acid and 1-aminophenyl-3-vinylsulfone of the formula

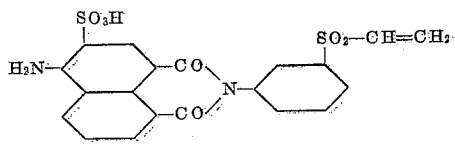

(9) the condensation product of 1 mol of benzaldehyde-4-vinylsulfone and 2 mols of N-ethyl-N-(3'-sulfobenzyl)-aniline of the formula

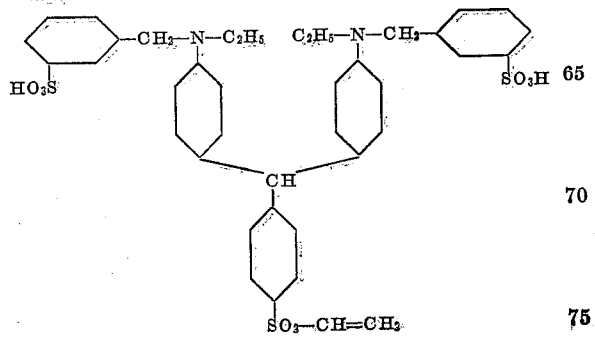

The dyestuffs have a special affinity for wool, silk, acetate silk, animalized staple fibers and polyamide fibers; according to the structure of the basic dyestuff molecule, they may also be used with advantage for dyeing cotton, staple fibers or other fibrous materials of vegetable origin. The dyeings are produced in the usual manner, using, for instance, 1-3 per cent. of the dyestuff, calculated upon the fibrous material. The vinylsulfone dyestuff may also be produced in the dyebath before the dyeing. By means of the usual printing methods local dyeings may be produced. Owing to the very reactive vinylsulfone group the dyestuffs may enter into reaction with the reaction groups of the fibrous material. They may also be polymerized on the fiber or they may be further condensed by reaction with compounds which are capable of reacting with vinylsulfone groups. By this procedure dyeings and prints are obtained which are distinguished by excellent fastness properties.

The following examples serve to illustrate the invention, but they are not intended to limit it thereto, the parts being by weight:

*Example 1*

2 per cent. of the dyestuff of the formula

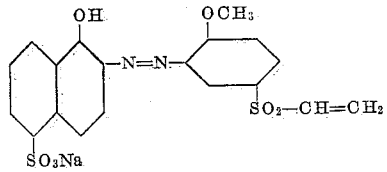

dyes wool in the usual manner from an acid bath. A vivid red dyeing of a good fastness to washing and to fulling in an alkaline solution, and a very good fastness to fulling in an acid solution, to perspiration and sea-water is obtained. The remaining fastness properties, such as fastness to rubbing, decatizing and bleaching are very good.

The dyestuff may be prepared as follows:

6.4 parts of 1-amino-2-methoxyphenyl-5-vinylsulfone are diazotized in the usual manner and the diazo solution is mixed at a temperature between 0° and 10° C., in the presence of sodium acetate, with an aqueous solution of 16.6 parts of sodium 1-hydroxy-naphthalene-5-sulfonate (of 44.6 per cent. strength). As soon as the coupling is complete, the dyestuff is filtered with suction, washed with sodium chloride solution and dried.

A dyestuff with similar properties is obtained by using 10.1 parts of sodium 1-hydroxy-naphthalene-4-sulfonate (of 73 per cent. strength) instead of sodium 1-hydroxy-naphthalene-5-sulfonate.

*Example 2*

2 per cent. of the dyestuff of the formula

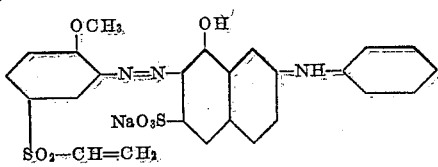

dyes wool from a bath containing sulfuric acid or acetic acid. A fine, covered brown dyeing of good to very good fastness to washing and of good fastness to sea-water and light is obtained. The decatizing, carbonizing and stoving tests are likewise very good. The dyestuff also has a good affinity for unloaded silk and polyamide fibers.

It may be prepared as follows:

A diazo-solution prepared in the usual manner from 6.4 parts of 1-amino-2-methoxyphenyl-5-vinylsulfone is mixed at a temperature between 5° C. and 10° C. in the presence of sodium carbonate with an aqueous solution of 11.2 parts of 2-phenylamino-8-hydroxy-naphthalene - 6 - sulfonic acid of 85 per cent. strength. As soon as the coupling is complete, the dyestuff is worked up as described in Example 1.

*Example 3*

2.5 per cent. of the dyestuff of the formula

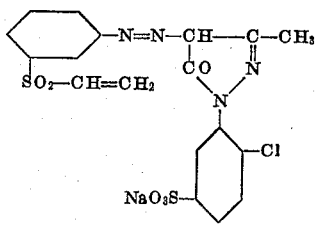

yields on wool a vivid yellow dyeing of a good fastness to fulling in an acid solution and to rubbing and a very good fastness to sea-water. The decatizing, carbonizing and stoving tests are likewise very good. The dyestuff also has a good affinity for unloaded silk.

It may be prepared as follows:

A diazo solution prepared in the usual manner from 5.5 parts of 1-aminophenyl-3-vinylsulfone is run, in the presence of sodium acetate, while cooling with ice, into an aqueous solution of the sodium salt of 1-(2'-chloro-5'-sulfophenyl)-3-methyl-5-pyrazolone (of 83 per cent. strength). When the coupling is terminated, the dyestuff is completely precipitated by the addition of a concentrated solution of sodium chloride, then filtered with suction, washed with a concentrated sodium chloride solution and dried.

A dyestuff having similar properties is obtained by using the diazo compound of 7.86 parts of 1-aminophenyl - 3 - (alpha-bromo-vinylsulfone) of the formula

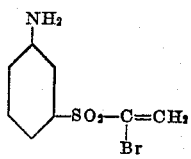

instead of 1-aminophenyl-3-vinylsulfone.

*Example 4*

2 per cent. of the dyestuff of the formula

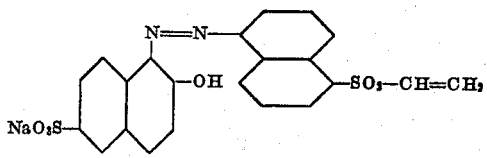

dyes wool from an acid bath. A vivid red dyeing of a very good fastness to washing, of a good fastness to sea-water and to rubbing and of a very good decatizing and carbonizing properties is obtained. The dyestuff also has a good affinity for unloaded silk.

It can be prepared as follows:

7 parts of 1-aminonaphthyl-5-vinylsulfone are diazotized in the usual manner and the diazo solution obtained is mixed in the presence of sodium acetate, while cooling with ice, with an aqueous solution of 9.4 parts of sodium-2-hydroxy-naphthalene-6-sulfonate. After the termination of the coupling, the dyestuff is filtered with suction, washed with a small quantity of water and dried.

*Example 5*

Wool is dyed in the usual manner with 3 per cent. of the dyestuff of the formula

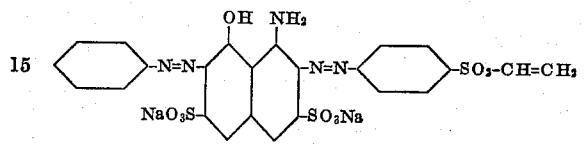

The dyestuff dyes wool in bluish-black tints of a very good fastness to water, a good fastness to washing and a good to very good fastness to light.

It may be prepared as follows:

21 parts of 1-aminophenyl-4-vinylsulfone are diazotized in the usual manner. To the ice-cold, clear solution obtained, a solution of 34.1 parts of 1-amino - 8 - hydroxy-naphthalene - 3:6 - disulfonic acid in 100 parts by volume of water and 5.5 parts of sodium carbonate is added, drop by drop, within 1 hour, while stirring well. Stirring is continued for 12 hours, the whole is heated to 50° C. and 20 parts of sodium hydroxide solution (of 30 per cent. strength) are added. This solution is mixed at 0° to 5° C. with a diazo solution of 9.3 parts of aniline. As soon as the coupling is complete, the whole is heated to 90° C. and salted out with 15 per cent. of sodium chloride. The dyestuff is then filtered with suction, washed with a sodium chloride solution and dried.

If wool is dyed with 3 per cent. of the dyestuff of the formula

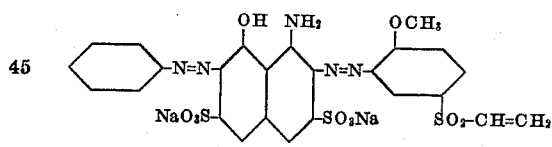

similar results are obtained.

*Example 6*

4 parts of the dyestuff of the formula

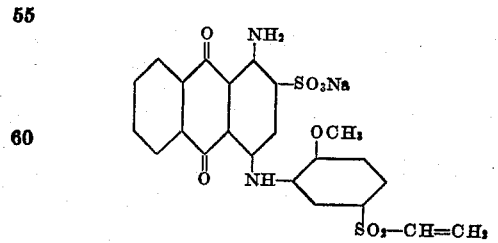

are made up with water, thiodiglycol and a tragacanth thickening so as to form 100 parts of a printing paste. After printing on wool, the wool is steamed for 20 minutes. A blue print of good fastness to washing and light is obtained.

When the dyestuff is dyed on wool in the usual manner from an acid bath, a clear, blue dyeing of a very good evenness and a good fastness to washing and fulling is obtained. The dyestuff also has a good affinity for unloaded silk.

It can be prepared as follows:

10.5 parts of the compound of the formula

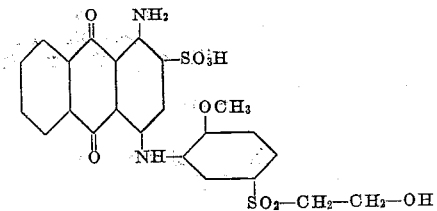

(prepared by condensing sodium 1 - amino - 4-bromoanthraquinone-2-sulfonate with 1-amino-2-methoxyphenyl - 5 - beta-hydroxyethylsulfone) are introduced at room temperature, while stirring, into 75 parts of sulfuric acid of 92 per cent. strength, and the whole is stirred for some hours at room temperature. The sulfuric acid solution is then poured onto 300-400 parts of ice. The sulfuric acid ester which has separated is well filtered with suction and dissolved at 50–60° C. in 1500 to 2000 parts of water. The blue solution obtained is mixed, while stirring, with dilute sodium hydroxide solution until the reaction remains alkaline. The dyestuff formed which corresponds to the first formula given in this example is completely precipitated, while applying heat, with a saturated sodium chloride solution. After cooling, the dyestuff is filtered with suction, washed with dilute sodium chloride solution until neutral and dried.

The dyestuffs of the following formulae

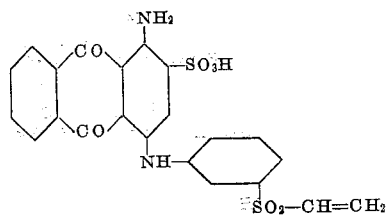

and

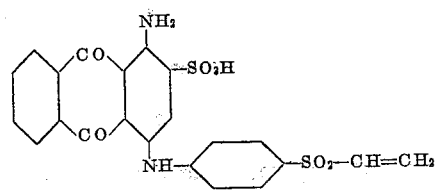

which may be prepared in the same manner dye wool clear, blue tints of good fastness properties.

*Example 7*

2 per cent. of the dyestuff of the formula

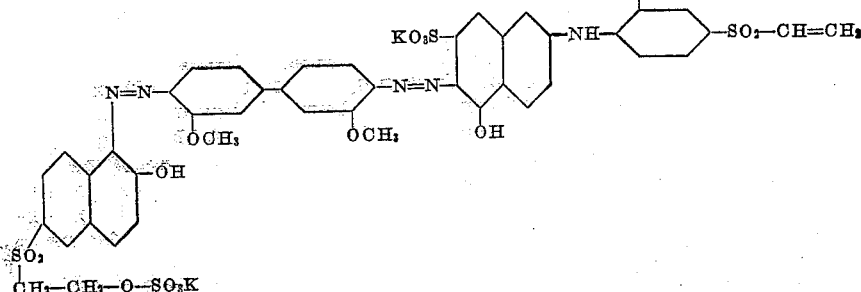

dyes cotton from a neutral bath. A blue tint of a good fastness to wet processing, and in particular of a good fastness to water and washing is obtained.

The dyestuff is prepared by combining the tetrazo compound of 4.4'-diamino-3.3'-dimethoxy-diphenyl first with 2-hydroxy-naphthalene-6-beta-hydroxy-ethyl sulfone and then with 2-(2' - nitro - 4' - beta - hydroxy - ethylsulfonyl) - phenylamino - 5 - hydroxy-naphthalene - 7 - sulfonic acid and transforming the dyestuff into the vinyl-sulfone compound according to the directions given above.

*Example 8*

Wool is dyed in the usual manner with 6 per cent. of the dyestuff of the formula

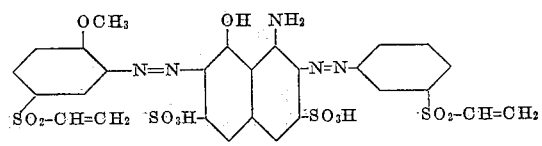

A bluish-black tint of very good fastness to water and good fastness to washing is obtained.

The dyestuff may be prepared as follows:

7.8 parts of 1-amino-8-hydroxy-naphthalene-3:6-disulfonic acid of 88 per cent. strength are dissolved in 50 parts by volume of water and the calculated quantity of 2N-sodium hydroxide solution; the filtered solution is caused to flow, while well stirring, into 15 parts by volume of 2N-hydrochloric acid, whereby the 1-amino-8-hydroxy-naphthalene-3:6-disulfonic acid precipitates again in a finely subdivided form. Into the acid suspension thus obtained 5.9 parts of the diazo-sulfuric acid ester of 1-aminophenyl-2-beta-hydroxy-ethylsulfone of the probable formula

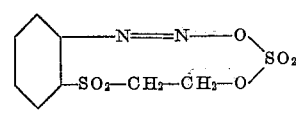

are then introduced. After the coupling in an acid solution is complete, the solution of the monoazo dyestuff formed, having the formula

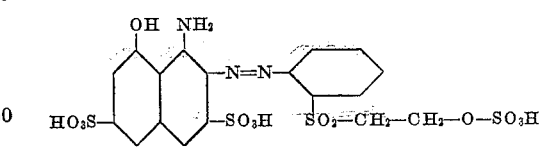

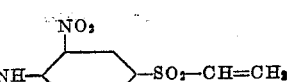

is cooled, while stirring, to 0-5° C., then mixed with the diazo solution prepared in the usual manner with 4.3 parts of 2-amino-1-methoxyphenyl-4-vinylsulfone, and rendered alkaline with 2N-sodium carbonate solution. When the coupling is complete, the dyestuff solution can be rendered acid with hydrochloric acid and the dyestuff can be salted out with 15 per cent. of potassium chloride. The dyestuff is filtered with suction and then washed with a potassium chloride solution until it is neutral to Congo paper. For the transformation of the sulfuric acid ester into the vinylsulfone group the disazo dyestuff is dissolved in water and the solution obtained is mixed, at 25-30° C. with dilute sodium hydroxide solution until the reaction remains feebly alkaline. The divinylsulfone dyestuff formed is then salted out with sodium chloride, filtered with suction and washed with sodium chloride solution until it is neutral and dried.

In a similar manner divinylsulfone dyestuffs of the following constitution may be prepared. These dyestuffs dye wool likewise in bluish-black tints of similar good fastness to wet processing:

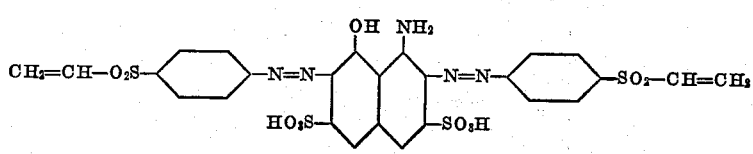

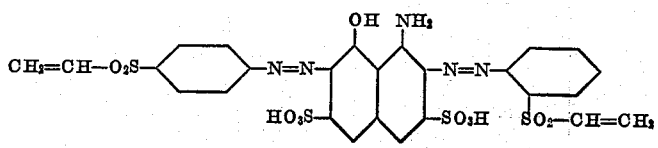

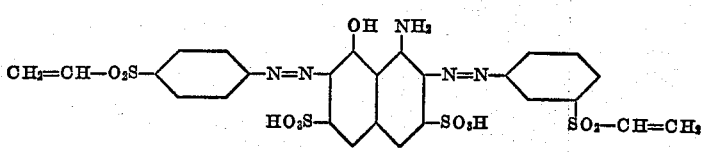

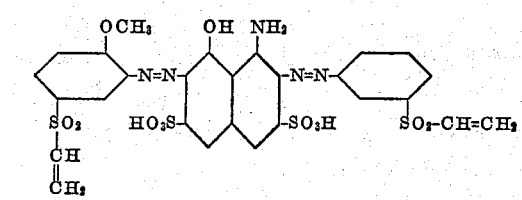

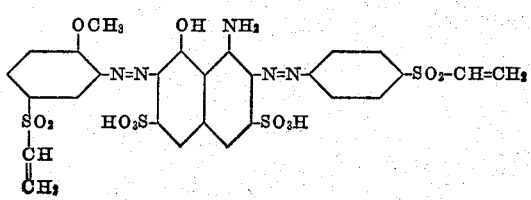

Example 9

30 parts of the potassium salt of the dyestuff of the formula

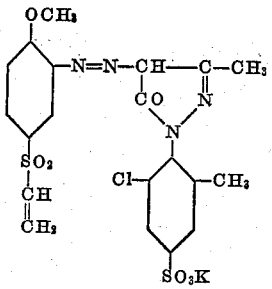

are dissolved with 10 parts of thiodiethylene glycol, 50 parts of triethanolamine and 200 parts of water. The solution obtained is stirred with 400 parts of neutral tragacanth thickening and made up to 1000 parts of printing paste. After printing on acetate rayon and drying, the material is steamed for 1 hour in a boiler and then thoroughly rinsed in the cold. A vivid yellow tint of good fastness to wet processing is obtained.

Example 10

A 6 per cent. dyeing produced on wool with the dyestuff of the following formula

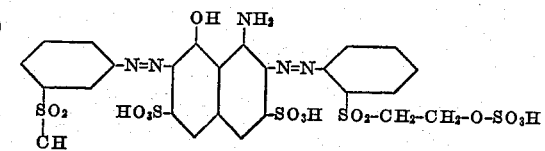

which may be prepared as described in Example 8, is carried out as follows:

The dyestuff is dissolved in water at 80° C., while maintaining the usual ratio of goods to liquor and while adding 6 per cent. of secondary sodium phosphate. The temperature of 80° C. is maintained for about 15 minutes. The dyebath is then rendered feebly acid by means of acetic acid and dyeing is carried out in the usual manner. A bluish-black dyeing of good to very good fastness to wet processing is obtained.

The following dyestuffs yield dyeings exhibiting the same good to very good fastness to wet processing:

| Constitution | Tint on wool |
|---|---|
| (1) [structure with Cl, OH, $SO_2$-CH=$CH_2$, $HO_3S$, NH-phenyl on naphthol azo] | Bordeau. |
| (2) $CH_2=CH-O_2S$—[phenyl]—NH—[phenyl]—NH—[phenyl] with $NO_2$ and $SO_3Na$ | Medium brown. |
| (3) [structure with $CH_3$, OH, $SO_2$-CH=$CH_2$, $HO_3S$, NH-phenyl] | Brown. |
| (4) [naphthol structure with OH, $SO_3H$, azo to phenyl with $OCH_3$ and $CH_2$-$SO_2$-CH=$CH_2$] | Vivid red. |
| (5) [naphthol with OH, $NH_2$, $HO_3S$, azo to phenyl with $SO_2$-CH=$CH_2$] | Vivid, bluish red. |
| (6) [phenyl with $OCH_3$, $SO_2$-CH=$CH_2$, azo to pyrazolone with N-phenyl bearing Cl, $CH_3$, $SO_3K$] | Yellow. |
| (7) [phenyl with $OCH_3$, $SO_2$-C=$CH_2$-$CH_3$, azo to pyrazolone with N-phenyl bearing Cl, $CH_3$, $SO_3K$] | Yellow. |
| (8) [naphthol with $HO_3S$, OH, $HO_3S$, azo to phenyl with $OCH_3$ and $SO_2$-CH=$CH_2$] | Clear orange. |
| (9) [naphthol with OH, $HO_3S$, $SO_3H$, azo to phenyl with $OCH_3$ and $SO_2$-CH=$CH_2$] | Yellowish red. |

| Constitution | Tint on wool |
|---|---|
| (10) | Yellow; afterchromed: yellowish brown. |
| (11) | Yellow; afterchromed: yellowish brown. |
| (12) | Yellow; afterchromed: yellowish brown. |
| (13) | Bordeaux; afterchromed: violet. |

We claim:

1. Dyestuffs, selected from the class consisting of azo-dyestuffs, nitro-dyestuffs, anthraquinone-dyestuffs and triphenyl-methane-dyestuffs, containing at least one sulfonic acid group and the grouping $$(-SO_2-CR=CH_2)_n$$

wherein R stands for a member of the group consisting of hydrogen, alkyl and bromine and $n$ stands for one of the numbers 1 and 2.

2. Azo-dyestuffs containing at least one sulfonic acid group and the grouping $$(-SO_2-CH=CH_2)_n$$

wherein $n$ stands for one of the numbers 1 and 2.

3. Azo-dyestuffs containing at least one sulfonic acid group and the grouping $$-SO_2-CH=CH_2$$

4. The dyestuff corresponding to the following formula:

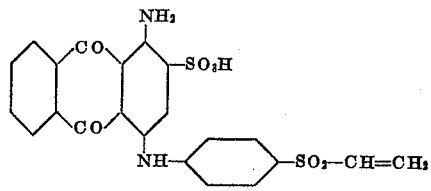

dyeing wool clear blue shades of a very good evenness and good fastness to washing, to fulling and to light.

5. The dyestuff corresponding the following formula:

dyeing wool clear blue shades of very good fastness to wet processing and good to very good fastness to light.

6. The dyestuff corresponding to the following formula:

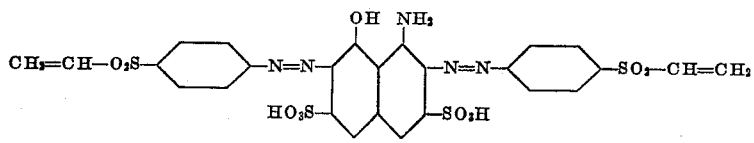

dyeing wool bluish-black shades of very good fastness to wet processing, and good to very good fastness to light.

7. The dyestuff corresponding to the following formula:

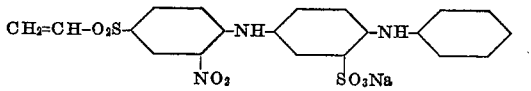

dyeing wool medium brown shades of very good fastness to wet processing, and good to very good fastness to light.

8. The dyestuff corresponding to the following formula:

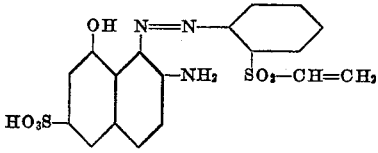

dyeing wool vivid bluish-red shades of very good fastness to wet processing and good to very good fastness to light.

JOHANNES HEYNA.
WILHELM SCHUMACHER.

References Cited in the file of this patent

UNITED STATES PATENTS

| Number | Name | Date |
|---|---|---|
| 2,082,156 | Felix et al. | June 1, 1937 |
| 2,163,180 | Ufer | June 20, 1939 |
| 2,424,493 | Muller et al. | July 22, 1947 |
| 2,432,403 | Felix et al. | Dec. 9, 1947 |
| 2,434,150 | Dickey et al. | Jan. 6, 1948 |
| 2,539,704 | Schoene et al. | Jan. 30, 1951 |

FOREIGN PATENTS

| Number | Country | Date |
|---|---|---|
| 492,749 | Great Britain | Sept. 23, 1938 |
| 901,199 | France | Oct. 30, 1944 |